Figure 1:
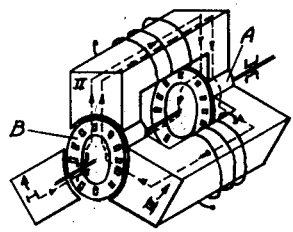

March 14, 1950   C. R. J. LACEULLE   2,500,365
ADJUSTABLE PITCH POLYPHASE INDUCTION MOTOR
Filed Jan. 2, 1948   3 Sheets-Sheet 1

Inventor: Clement R.J. Laceulle
By: *[signature]*
His Attorney

March 14, 1950 C. R. J. LACEULLE 2,500,365
ADJUSTABLE PITCH POLYPHASE INDUCTION MOTOR
Filed Jan. 2, 1948 3 Sheets-Sheet 2
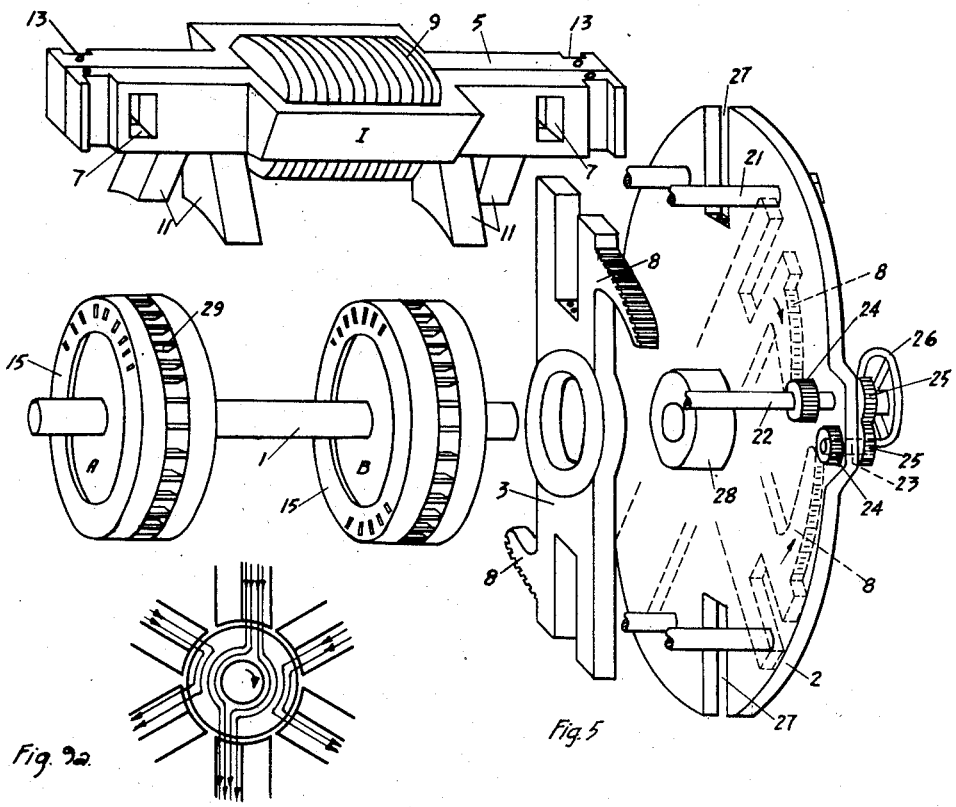
Fig. 5
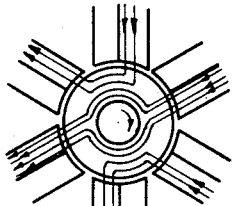
Fig. 9a.
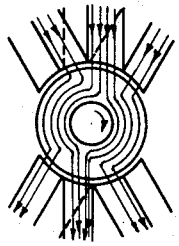
Fig. 9b.
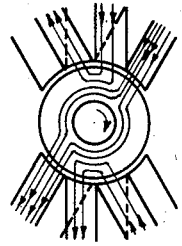
Fig. 9c.
Fig. 9d.
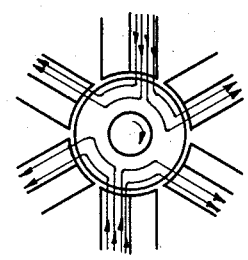
Fig. 10a.
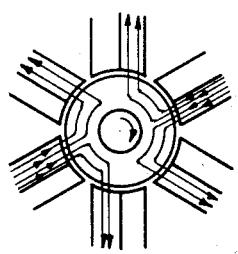
Fig. 10b.
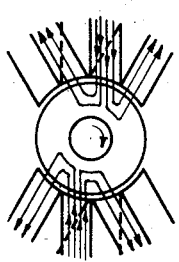
Fig. 10c.
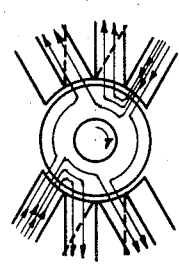
Fig. 10d.
Inventor: R.J. Laceulle
By: His Attorney Inventor: Clement R. J. Laceulle By: His Attorney Patented Mar. 14, 1950

2,500,365

UNITED STATES PATENT OFFICE 2,500,365

ADJUSTABLE PITCH POLYPHASE INDUCTION MOTOR

Clement Robert Joseph Laceulle, The Hague, Netherlands, assignor to Shell Development Company, San Francisco, Calif., a corporation of Delaware Application January 2, 1948, Serial No. 100
In the Netherlands January 6, 1947

4 Claims. (Cl. 318—243)

The invention relates to a three-phase induction motor with short-circuit rotor (squirrel-cage rotor) designed for continuous speed control, the stator being provided with poles (preferably projecting poles) which can be displaced along the circumference of the rotor in such a manner that the pole-pitch between the poles of the three phases can be varied.

Such induction motors are already known from the German Patent Specification No. 350,439 and from the British Patent Specification No. 10,970 A. D. 1910.

The drawbacks attaching to the already known systems are of such a nature that no practical application has been found as yet. The motor described in the German Patent Specification No. 350,439 consists of a soft iron ring capable of rotating on a spindle, surrounded by a grouping of three phase-wound poles the two outermost of which can be moved tangentially by means of a threaded bar. The drawback of this construction is that the magnetic flux generated by the movable poles has to be closed mainly by air, whilst the path of the lines of force becomes larger according as the pole-pitch is increased. The torque already reduced by high leakage, decreases still further as the speed of the motor increases.

The motor described in the British Patent Specification No. 10,970 A. D. 1910 consists of three axially adjacent stator yokes interconnected by a collar of laminated cross-connectors running in the axial direction, each fitted with two mutually opposite projecting poles. The poles of the outermost yokes can be moved tangentially in such a manner that the displacement with respect to the fixed middle poles is in opposite sense. As a result the squirrel-cage rotor, consisting of three separate laminated iron rings with laminated iron cross-connectors, will rotate at a speed dependent of the pole-pitch adjustment.

The motor has a pole position at which the speed is nil because the bars of the rotor are in that case induced by three fields having a phase displacement of 120° each. When the pole-pitch is increased from nil onwards some of the bars are at first still influenced by three fields, whilst an increasing number of bars become influenced by two fields and by only one field. The number of bars influenced by three fields decreases linearly and hence the torque shows a linear increase; the torque will therefore not be sufficient to start the motor under load.

When the pole-pitch is further increased the outermost fields of one half of the stator come inside the range of the outermost fields of the other half, and vice versa, as a result of which different pole-pitches occur and retarding torques are produced, until finally a symmetrical distribution of the poles is achieved.

If these retarding torques are to be avoided in the case of a pole-width of 90° as indicated in the British patent specification it is only possible to use a displacement of 45° from the zero position, which corresponds to a speed of 1125 revs./min. if the speed with a pole-pitch of 60° is assumed to be 1500 revs./min. ($p=2$).

The speed of 1125 revs./min. without a retarding torque can be increased to 1500 revs./min. when using a pole-width of 60°. Here again the torque only increases gradually up to a speed of 750 revs./min. and then remains constant up to 1500 revs./min.

The motor then shows the drawback that the poles only oppose a small portion, viz. one third, of the circumference of the rotor, which means that for a given power the motor has to be of large dimensions, especially the stator. Besides, the mechanical construction for pole displacement of the motor according to the British patent entails constructional difficulties.

The motor according to the invention does not show the drawbacks mentioned above and comprises a stator with separate, axially-directed, yokes each having a phase winding, the extremities of the said yokes forming the poles, and a rotor mainly consisting of two short-circuit rotors (squirrel-cage rotors) mounted on the same shaft, which rotors are preferably of the "skin effect" type with high and narrow bars, each of which rotors oppose a group of poles.

In a construction with 6 poles, using the pole-number changing system, the speed can be controlled from 750 to 1500 and from 1500 to 3000 revs./min., thus covering a range from 750 to 3000 revs./min.

The torque throughout this range is always the maximum torque. Each of the stator fields is "double-active," i. e. active at two rotors, with the advantage that a core with a small cross-section may be used, thus also reducing the length of the phase windings around the yokes. The windings are, moreover, partly situated in the space between the rotors, as a result of which the radial dimensions of the motor need not be large.

The mechanical construction for the pole displacement may be of very simple design. This applies to the entire assembly of the motor, which can be constructed from simple parts.

The motor described in the British Specification No. 10,970 A. D. 1910 and that claimed in the present application each have their own range of speed control, which ranges overlap. In the first-mentioned motor control is effected from nil upward to about 1500 revs./min., whilst in the motor claimed in the present application the range of control is from 3000 down to 750 revs./min., using once the pole-number changing system. This applies to both directions of rotation. The minimum speed can be further reduced, if necessary, by using narrower poles.

The motor claimed in this invention has a smooth and loss-free speed control, so that at all speeds it shows a normal induction motor characteristic. It can therefore take the place of motors with slip ring rotor in which, owing to the series resistance in the rotor circuit, speed control is accompanied by increase of Joule losses which adversely affect the efficiency of the motor. On account of its much wider range of control and constancy of torque, it may also supersede induction motors having a pole-number changing system whereby speed control can only be effected in jumps.

Finally, on account of its great adjustability and simple construction this motor can in many cases take the place of three-phase commutator motors which are more costly and require more attention.

The motor opens up the following new possibilities:

(a) Propeller-shaft drive for turbo-electric or Diesel electric ships.

(b) Axle drive for Diesel electric traction, enabling normal 3-phase generators to be used, whilst no further commutators are required in the main circuit.

(c) Simplification of the gears of many machine tools, since a portion of the required speed control can be achieved by adjustment of the driving motor.

The use of friction drives and liquid transmissions thus becomes superfluous.

Figure 2:
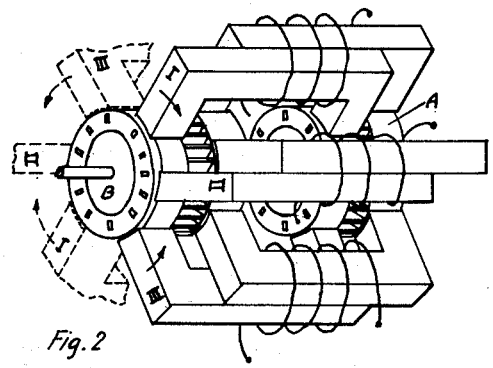
Figure 3A:
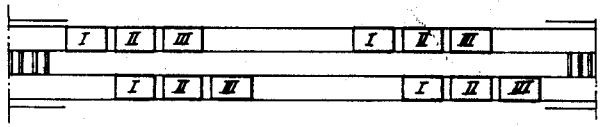
Figure 3B:
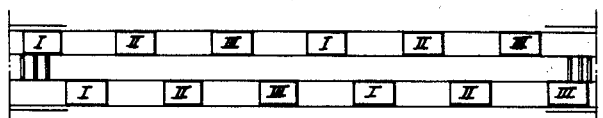
Figure 4:
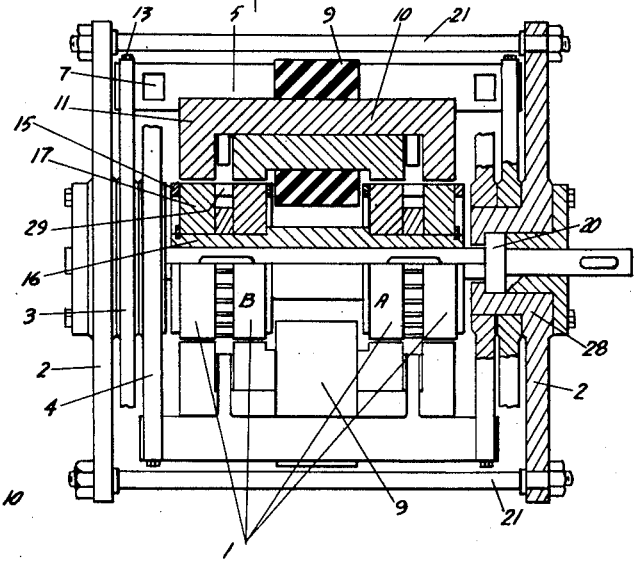
Figure 8:
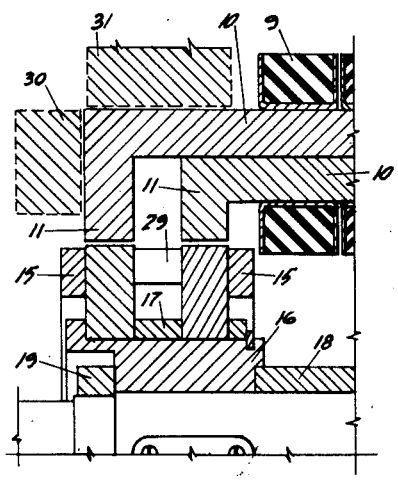
Figure 6:
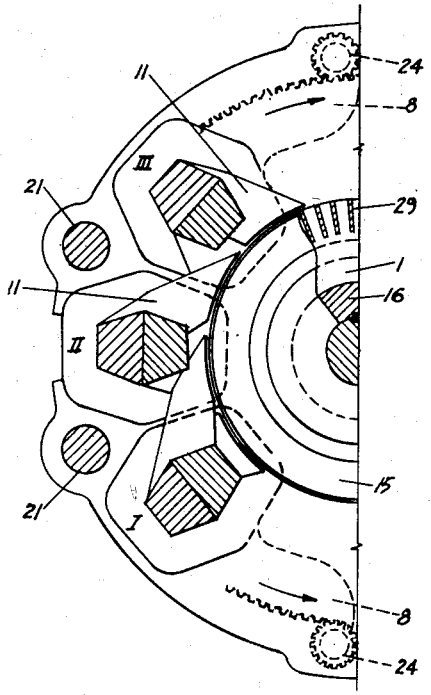
Figure 7:
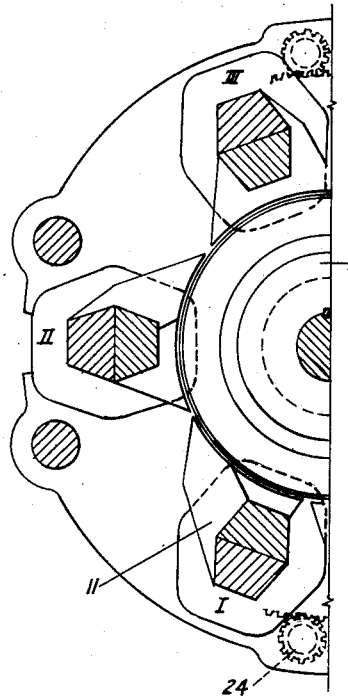
Figure 12:
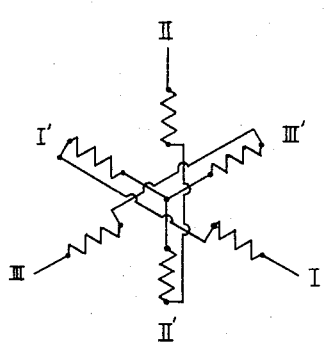
Figure 11:
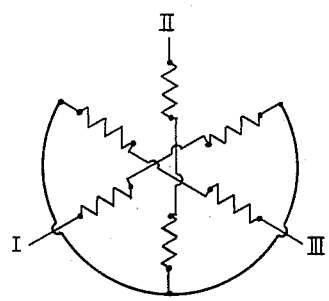

The invention is further illustrated in the accompanying drawings in which Fig. 1 is a perspective diagrammatic view of the motor; Fig. 2 is a perspective view diagrammatically showing a modification; Figs. 3a and 3b are diagrams showing extreme pole positions under different adjustments; Fig. 4 is a side view, partly in section, of a practical form of the motor; Fig. 5 is an exploded perspective view showing the double rotor, one of the pole units and gearing used to adjust the units for various positions of the poles; Figs. 6 and 7 are partial end views of the motor partly in section showing minimum and maximum speed positions of the poles; Fig. 8 is a fragmentary sectional view showing the axial relation of rotor and stator poles; Figs. 9a to 10d are diagrammatic end views of the motor showing the flux paths for various pole pitches; Figs. 11 and 12 are wiring diagrams of the connections of a polyphase winding for the motor.

Mounted on the motor shaft are two separate squirrel-cage rotors A and B. In this type (where $p=1$ with simple poles) the stator consists of three separate axially-directed laminated yokes I, II and III the extremities of which are bent at right angles to form projecting poles which partly embrace the two squirrel-cage rotors A and B. Each of the yokes mentioned carries one phase winding, which windings, in star or delta connection with each other, are connected in the ordinary way to a 3-phase main supply.

The three yokes can be moved closer to each other in a tangential direction from the symmetrical position shown in the figure; by doing so the pole-pitch will be reduced. When the winding on yoke II at a given moment carries the maximum current, the lines of force of this yoke run inward into rotor A; on emerging from this rotor they divide and pass through yokes I and III; then they pass into rotor B and, recombining, pass out of this rotor back into yoke II; a similar reasoning applies when other moments are considered. Each of the two rotors is under the influence of a rotating magnetic field; the two fields each have the same direction of rotation but are naturally shifted 180° in phase with respect to each other.

The peripheral forces acting upon the rotors thus reinforce each other and jointly contribute to the resulting torque.

One of each of three yokes, viz. the middle one is permanently connected to the motor frame or casing. The two adjacent yokes are fixed to rotatable supports (arms), the desired speed being adjusted by turning these yokes simultaneously either towards the fixed yoke or away from it.

In order to have the centre lines of the poles as close together as possible, i. e. in order to arrive at a minimum speed, it is essential that the poles of the said yokes which belong to one and the same rotor should overlap two by two.

According to the invention the poles of the three phases can partly overlap by splitting up each of the yokes into two separate parts, which are jointly phase-wound and have poles, which are axially and tangentially separated from each other and rotors each of which consists of two ferromagnetic axially shifted parts, which are spaced from each other by a non-ferromagnetic part, each rotor part being opposed by one of the said poles of each yoke. The bars of each of the squirrel-cage rotors pass through the two ferromagnetic rotor parts and cross the non-ferromagnetic space between them.

It is true in this case the rotors for a given power are increased in length, but the advantage is now gained that when the yokes are turned away from each other, the magnetic field assumes a more continuous character with respect to the passing rotor bars, than was the case in the construction of Fig. 1, where the field striking a bar is interrupted after each pole.

This is shown diagrammatically in Fig. 2, for a motor with 2 sets of three-phase yokes each having 3 poles per rotor. For easier survey, however, only one set of yokes has been drawn in full, whilst the position of the other is shown by dotted lines. The subdivided poles of yokes I and III can move behind or in front of the poles (also subdivided) of the fixed yoke II. It is, however, in no case possible for one rotor bar to be influenced by 3 phases at a time, in which case it would be currentless.

In order to minimize leakage it is necessary to maintain a certain clearance, both axially and tangentially, between the poles of the various phases. The ultimate shape of the poles (Fig. 6) is connected with the above requirement of minimum leakage.

The centre-to-centre distance between the mutually overlapping poles belonging to one set of yokes I, II and III determines the pole-pitch $t_p$ and hence the synchronous speed.

The rotor bars which, in the course of clockwise rotation, have passed the pole of yoke III, are during a certain interval not opposed by a stator pole. They do not again undergo the influence of a magnetic field until they come under the pole of yoke I of the next set of yokes. The varying distance between the poles of yokes III and I of two different sets of yokes which poles never overlap therefore has no influence upon the speed.

Overlapping is nil at the position of maximum speed, and all the poles of the two sets of yokes form equal angles of 60° with each other. Overlapping is a maximum at the position of minimum speed, and the angle between the yokes of one set is then 30°.

This is made clear by Figs. 3a and 3b, in which the extreme pole positions for one rotor have been indicated. The pole positions which can be adjusted between these two extremes, correspond to the intermediate speeds occurring within the range of speed control.

The ratio between the $t_p$ max. and $t_p$ min. which a motor can attain depends upon the size of the pole-width and determines the degree of control in revolutions per minute.

With a ratio of 2:1 and in combination with a pole-number changing system, a smooth variation of speed from approximately 3000 down to 750 R. P. M. is achieved.

Figs. 9 and 10 show the path of the lines of magnetic force through the rotors in the respective pole-number circuits and pole positions. For easier survey, only the lines of force in the foremost of the two parts of rotor B have been indicated.

In the case of Fig. 9 (for which $p=1$) the electrical circuit of Fig. 11 (star connection) is applicable. Fig. 9a shows the path of the lines of force when the phase winding on yoke II, which for the sake of brevity is called phase II, carries the maximum current; Fig. 9b shows the path of the lines of force 60 electrical degrees later. The synchronous speed, in view of the symmetrical position of the poles as given in the drawing, is 3000 R. P. M. Figs. 9c and 9d depict identical moments, the only difference being that the angle of the poles belonging to one group is reduced to half the value. In the same interval of 60 electrical degrees the rotor bars have only to traverse half the distance and hence the synchronous speed will correspond to 1500 R. P. M.

After change of pole-number the electrical diagram, which is for star connection, assumes the aspect of Fig. 12, so that now $p=2$, but with single poles. The path of the lines of force at maximum current in phase II is indicated by Fig. 10a, whilst Fig. 10b shows the state of affairs 120 electrical degrees later. As a result of the symmetrical position of the poles the synchronous speed is now 1500 R. P. M. Figs. 10c and 10d again depict identical moments in cases where the pole-pitch is reduced to half the value, the circuit of Fig. 12 being maintained. The synchronous speed of the rotor will consequently decrease to 750 R. P. M.

A more constructive scheme is given in Fig. 4, which depicts a longitudinal section together with a view of the motor. Figs. 6 and 7 give an enlarged front view after removal of the front shield of the motor, adjusted for minimum and for maximum speed respectively. Fig. 6 furthermore gives a cross-sectional view of the front rotor, whilst in Fig. 8 the same rotor is seen in longitudinal section. The Fig. 5 diagram shows the main constructional parts of the motor in perspective when disassembled. The same parts in Figs. 4–8 are indicated by identical reference numbers.

The above figures show how armature 1 with the two rotors A and B is lodged in the two motor shields 2, which are provided with a ball bearings case 28 containing ball bearings 20. These two motor shields are fixed to each other by bolts 21 and together form the actual frame which supports all further parts of the construction.

The bronze casing of the fixed yokes II can be fixed in the rectangular notches 27 of shields 2, as a result of which the shields are more strongly joined together.

The two other yokes I and III are similarly fixed to arms 3 and 4 on the left and right sides of yoke II, the arms being able to rotate around the cylindrical outer side of the ball bearings cases 28 (see especially Fig. 5).

The laminated yoke 10 is housed complete with phase winding 9 in a bronze casing 5 made in two halves, whereby poles 11, distributed over two strips per rotor, are also secured. There must naturally be an opening at the bottom so that no short-circuited secondary circuit can be formed. For this reason the bronze casing must be insulated from the iron of the yoke. The bronze casing is of different length for each of the three phases, whether it be fixed to the inner arms, the outer arms or the motor shields (yokes II).

Variation of the pole-pitch is effected with the aid of pinions 24, which turn the arms by means of toothed segments 8. These toothed segments also serve to transmit the reaction torque of the displaceable yokes via the pinions to the frame (the shields).

In order that the arms to which yokes I are fixed shall have the same displacement, but in opposite sense as the arms carrying yokes III, the pinion spindles 22 and 23 are coupled together on the outer side of shields 2 via two gears 25. In this engagement the forces involved, due to the reactive force of the rotatable yokes, act in the opposite direction, and the two toothed segments thus maintain each other in equilibrium.

The above-described speed-adjusting device is therefore free of load and the spindles can quite easily be turned by means of handwheel 26 on spindle 22 to effect speed control. The new position can in this way be set without the use of a locking device. To permit simultaneous control of the adjusting device on the other motor shield, spindle 22 has been extended accordingly.

Other load-free constructions for speed adjustment are also possible. Use may be made, for instance, of one single continuous spindle on which pinions acting upon toothed segments with inner- and outer teeth are fitted, the pinion spindle being thereby kept in equilibrium without the use of gears 25.

The bronze casings 5 are fixed to the arms with bolts 13. Notch 7 in casing 5 of yoke I is required to allow the toothed segment 8 of yoke III to pass through at the "max. speed" position. This notch can be dispensed with if, for instance, the toothed segments are projected on to a larger radius.

Rotors A and B of armature 1 are short-circuit rotors with shorting rings 15. As the stator poles of each phase are distributed over two planes, the middle part of a rotor remains unused. No ferromagnetic material may be present in this part, since the lines of force of two overlapping poles belonging to different phases would otherwise tend to form a closed magnetic circuit without having intersected the rotor bars. In the middle part rotor bars 29 are consequently quite free; they are extremely well cooled, thus increasing the overload potentialities of the motor. The two parts of a rotor are separated from each other by the bronze ring 17 and are magnetically insulated from the shaft by the bronze hub 16. In Fig. 8 there is a distancing-bush 18 between the two rotors A and B, the latter being locked by the securing nut 19.

In view of the mutual adjustability of the yokes it is obviously not possible to utilize all the constructional space around the rotors. Which portion of this space remains unused, depends upon how much speed variation is desired.

If the ratio between maximum and minimum speed (with each of the two pole-number changing systems) is to be 2:1, this means that the angle between the pole centre lines must be capable of reduction from 60° to 30°, i. e., phase-yoke I and phase-yoke III must permit of being moved over an angle of 30° to phase-yoke II.

For the three phases together a sector of 180°−2×30°=120° thus remains available as constructional space, corresponding to a sector of 40° per phase. In the case, therefore, of a speed variation corresponding to the above ratio of 2:1, two thirds of the space surrounding the rotor can be utilized constructionally.

The fact that the space surrounding the rotors cannot be fully utilized for construction purposes, does not lead to undue bulkiness of the motor, since the stator design embodies the special feature that the core iron is doubly active.

The lines of force intersect rotor bars, viz., those of rotor A and those of rotor B, both when passing into a yoke and when emerging from it. For a given power, therefore, it is possible to manage with half the magnetic flux normally required, i. e., with half as great a cross-section of iron. The motor according to the invention will thus possess the outstanding advantage of a relatively light stator with short windings.

At the "maximum speed" position (Fig. 7) the rotatable yokes of one set may be allowed to touch the rotatable yokes of the other set provided that the centre lines of all six poles form angles of 60° with each other. This means that the poles of yokes I and III must be inclined in the direction of the fixed yoke of phase II. As a result of the fact that each pole is split up in the axial and tangential direction into two parts, all three of them assume a somewhat different shape.

Other reasons for adopting a shape as outlined in Figs. 6 and 7 were:

(a) The desirability of assigning approximately equal lengths to parts of a pole which are situated in the same plane. On this account it was necessary to shift the center line of the fixed poles II slightly in a tangential direction.

(b) The necessity of keeping the leakage coefficient as low as possible.

With a form of construction as shown in the drawing and when using medium size motors it has been found possible to arrive at a $t$ value from 0.1 down to about 0.075 notwithstanding the presence of a double number of air gaps, the variation in value of $t$ being dependent upon the position of the pole at the various pole-pitches.

This corresponds to a theoretically obtainable power factor (cos $\varphi$) of from 0.83 to 0.87.

The length of the iron-free middle part of each rotor is related to the axial distance of the two strips over which the poles of each yoke are distributed. This distance depends in turn upon the leakage coefficient it is desired to obtain for the motor. Fig. 8 gives an idea of the constructional proportions with a normally acceptable leakage.

The employment of otherwise normal short-circuit rotors may possibly entail difficulties if the speed is increased too quickly, because in this case the slip is initially increased so that the critical torque may be exceeded.

It is on this account preferable to use a rotor with a high starting torque, e. g. a double squirrel-cage rotor, or a rotor with high and narrow bars ("skin effect" rotor).

Owing to the iron-free middle part of the rotors the bars turn out longer, and in order to adhere to the usual values for slip (rotor efficiency) the bars must be made thicker as well. This means that in the case of a double squirrel-cage rotor the rotor teeth will be too much constricted locally, whereas when using a "skin effect" rotor with high and narrow bars this difficulty does not exist. For this latter case, therefore, the necessarily larger cross-section of copper may be turned to good account for the starting and "following" of the rotor when increasing the speed by using the speed control device.

The bars may be placed parallel to the shaft, since there are no slots in the stator; this also obviates the possibilty that at positions near the maximum speed some bars may be opposed by poles of different phases.

The optimum dimensions for the type of motor according to the invention are obtained when short rotors of relatively large diameter are used. This naturally follows from the formula $$\mathrm{kv.\text{-}a.} = c.D^2.l.n.$$

in which $c$=constant, $D$=rotor diameter, $l$=active length of a rotor bar, $n$=revolutions per minute.

When the diameter ($D$) is increased the length of the rotor ($l$) therefore decreases quadratically, with consequent saving of copper.

A construction of this kind for the purpose envisaged is not only a good practical proposition (since part of the windings can come between the two rotors), but is also desirable because the height of the stator yoke is equal to the "active" length of one rotor bar (i. e., the total length of the two parts of the rotor consisting of iron).

In the above case the stator yokes will not only be shorter but will also have a lower height.

The width of the stator yoke (in tangential direction) is naturally related to the diameter of the rotor and the degree of saturation (magnetic field strength) that may be permitted in the iron.

As a result of the form of construction mentioned the six double-active stator yokes are of minimum weight (with consequent low iron losses) and minimum cross-section, so that also the weight of copper and the Joule-losses of the windings will be reduced on account of the short windings. At the same time the distance between the iron and the rotor-shaft will be automatically increased, so that the magnetic leakage along this path will be diminished.

The form of design offering the utmost advantage from the electrical, magnetic and constructional points of view is therefore the more or less compact "flat" form with a relatively large diameter. Owing to the shorter magnetic circuit thus produced, the number of ampere-turns and the power-factor (cos $\varphi$) show very acceptable values in spite of the presence of a double number of air gaps.

These air gaps may be very small when ball bearings are used, especially as it is possible to adjust each of the stator yokes separately with respect to the rotor (with the aid of adjusting plates, if necessary) in the rotatable arms and in the motor shields.

With the compact construction shown in Fig. 4 it is essential that the rotating arms 3 and 4 should also be made of non-magnetic material in order to reduce the amount of leakage.

The rotating field, jumping more or less from pole to pole, might cause tooth pulsations and pole-shoe pulsations. For the same reason the currents in the rotor bars and shorting rings will be less regular than in the case of a standard motor with squirrel-cage rotor and 3-phase windings. The additional losses arising from this are, however, of secondary importance and may only be manifested in the form of a slightly larger slip.

In order to minimize the "jumps" of the rotating field it is desirable that the motor, even if a speed variation of only 3000 down to 1500 R. P. M. is required, should be designed with six (double) instead of three (single) poles.

As in the case of normal 3-phase motors, the number of pairs of poles $p$ can within certain limits be increased at will. The suspension devices of the rotatable yokes then have respectively 3, 4, 5, etc. arms which form equal angles with each other.

Last but not least, the motor in question, on account of the fact that the voltage difference between the successive layers of stator windings is slight, is very well adapted for high voltage mains.

Starting may be effected in three different ways.

(a) Normally by means of a star-delta switch. In the case of motors of large size this should of course be effected at the "minimum speed" position to avoid high starting currents.

(b) When $p \geq 2$, each set of phase windings may be designed for the full mains voltage and be switched in parallel in succession across the mains. With smaller motors, however, the copper space-factor is in this case less good.

(c) The poles on one side of the yokes can be short-circuited magnetically by means of a soft-iron construction (bow), with the result that the corresponding rotor is put out of action during starting, thus giving a lower starting current. After the motor has been started up by means of the other rotor, which is still "active," the soft iron construction (which may be incorporated telescopically in the motor casing, for instance) is pulled back during a brief interruption of current, whereupon the motor can take up the whole load with two fully active rotors.

The positions at which the soft iron construction, consisting of bows, can be fitted, dependent on the method of fixing the yokes, is shown by the dotted lines (30 and 31) in Fig. 8.

I claim:

1. An adjustable speed poly-phase induction motor comprising a rotor shaft, two squirrel-cage type rotors mounted on said shaft axially of each other, a stator comprising a plurality of elongated yoke members circumferentially disposed about said shaft, the longitudinal portions of said yoke members being parallel to said shaft, the ends of each of said yoke members forming pole faces disposed opposite said rotors, a single phase winding about each of said yoke members, and means for angularly shifting the position of said yokes about the axis of said shaft, whereby the pole pitch and the speed of said motor is varied.

2. An adjustable speed poly-phase induction motor comprising a rotor shaft, two squirrel-cage type rotors mounted on said shaft axially of each other, each of said rotors comprising two axially spaced ferro-magnetic annular members, non-magnetic connector elements therebetween, a stator comprising a plurality of elongated yoke members circumferentially disposed about said shaft, each of said yoke members comprising two laminated cores longitudinally co-extending parallel to said shaft, the ends of each of said cores forming two pole faces, the pole faces on one of said cores being symmetrically offset with regard to the pole faces on the other core of the same yoke member along the axis of said shaft and at right angles thereto, the four pole faces of each yoke member being respectively in register with and radially adjacent the four ferro-magnetic annular members of the two rotors, and a single phase winding about the two cores forming each of said yoke members.

3. The motor of claim 1, comprising a motor casing supporting said shaft, three yokes each carrying a winding of different phase, means fixedly attaching one of said yokes to said casing, toothed cam means mounted on said shaft rotatably supporting each of the other two yokes on either side of the fixed yoke, and pinion means mounted in the motor casing in engagement with said toothed cam means, whereby the rotation of said pinion means in one direction causes a simultaneous motion of the two rotatably supported yokes towards the fixed yoke, and the rotation of said pinion means in the other direction causes a simultaneous motion of the two rotatably supported yokes away from the fixed yoke, the electro-magnetic loads on said rotatable yokes neutralizing each other through said pinion means.

4. The motor of claim 1, comprising means for rendering one of said rotors inactive during the starting period, said means comprising a motor casing having an opening, and a soft iron bow element movable therein into proximity to the pole means on one side of said yoke members, whereby said pole means are magnetically short-circuited.

CLEMENT ROBERT JOSEPH LACEULLE.

REFERENCES CITED

The following references are of record in the file of this patent:

UNITED STATES PATENTS

| Number | Name | Date |
|---|---|---|
| 1,514,474 | Stewart | Nov. 4, 1924 |

FOREIGN PATENTS

| Number | Country | Date |
|---|---|---|
| 10,970 | Great Britain | of 1910 |
| 350,439 | Germany | Feb. 19, 1921 |
| 430,666 | Great Britain | June 24, 1935 |